United States Patent [19]

Hwang et al.

[11] Patent Number: 5,404,768
[45] Date of Patent: Apr. 11, 1995

[54] SPEED CHANGING ARRANGEMENT FOR THE BICYCLE

[76] Inventors: Tan J. Hwang, No. 1, Path 19, Lane 98-21, Section 2 Taichung Kang Rd., Taichung; Chin K. Lo, 5F-1, No. 11, Lane 23, Wan-Chin Street, Taipei, both of

[21] Appl. No.: 47,428

[22] Filed: Apr. 15, 1993

[51] Int. Cl.⁶ ............................................. F16H 3/08
[52] U.S. Cl. ....................................... 74/371; 74/372; 74/369
[58] Field of Search ........................... 74/371, 372, 369

[56] References Cited

U.S. PATENT DOCUMENTS

| | | | |
|---|---|---|---|
| 2,956,443 | 10/1960 | Nelson | 74/372 |
| 3,948,542 | 4/1976 | Lukich | 74/372 |
| 4,702,121 | 10/1987 | Hartmann | 74/371 |
| 4,771,636 | 9/1988 | Fujita | 74/372 |
| 4,858,739 | 8/1989 | Nemoto | 74/371 |
| 5,305,651 | 4/1994 | Perego | 74/372 |

*Primary Examiner*—John T. Kwon

[57] ABSTRACT

A speed changing arrangement for the bicycle having a changing arrangement mounted on the frame of the bicycle and positioned between the left and right pedals. The speed changing arrangement generally includes: a speeding changing gear set engaging an output gear set, a gear shifting shaft and a hand lever to manipulate the gear shifting shaft. The hand lever can be utilized to manipulate a neutral gear cable and a gear shifting cable, so that the gear shifting shaft can be moved within a spacing between the speed changing gear set of the desired gear stage and the output gear set.

1 Claim, 8 Drawing Sheets

SPEED CHANGING ARRANGEMENT FOR THE BICYCLE

FIELD OF THE INVENTION

The present invention is related to a method of speed changing wherein by means of the arrangement of a gear shifting shaft set in the spacing directly between the speed changing gear set and the output gear set, the gear shifting process can be first manipulated to the neutral gear state and then change to the desired gear, which may improve and replace the conventional methods of speed changing utilizing a chain to skip across gears.

BACKGROUND OF THE INVENTION

The method for manipulating speed changing in a speed changing arrangement of an ordinary bicycle is to utilize a chain to skip up or down between the pedal gear of the pedal shaft of the bicycle body and the chain sprocket set of the rear wheel so as to select and replace the chain sprockets among different diameters to achieve the effect of speed changing. It is well known to those skilled in the prior art that this type of speed changing potentially bears several inevitable disadvantages:

1. Although there are a lot of bicycle products in the market with the speed changing capability of ten speed stages or more, however, after interviewing with many experienced riders, it is found that, in spite of the various speed stages, the distinction between adjacent speed stages is not significant; in the view of practicality, even the car or motorcycle has no more than five speed stages in speed changing, it is therefore not necessary to have so many speed stages, but should rather enhance the difference between speed stages so as to decrease the number thereof; the reason for applying so many speed stages is due to the characteristics of the speed changing methods which utilize the chain to skip across gears wherein if there were only several practical chain sprocket sets chosen, it will be difficult for the chain to skip across gears and the uncertain phenomenon in speed changing may occurs, since the difference between the diameters of the chain sprockets is too large.

2. It is very difficult for the rider in riding to clearly know what speed stage the gear is really in now, because it is hard to recognize the speed stage even from the appearance or from the feeling.

3. It may readily cause the serious friction and chain coming-off phenomenon while the chain is skipping across between the chain sprocket sets. In the case, for example, of speed changing from the lowest speed to the highest speed, the chain at least has to skip three chain sprockets therebetween, thus such a condition may readily provoke the gravity wearing phenomenon for the chain on the surfaces of the gears.

4. The noise phenomenon occurs frequently during riding. This is because the adjacent chain sprockets are too close, so that, after the chain has been pushed for gear shifting, although the gear shifting has been completed, the chain may still contact the side surface of the adjacent sprocket gear due to the slight deviation, which may generate noise via the friction therebetween and may uncomfortably annoy the rider.

It can be found from the associated situations mentioned above and the live observation that, unless in the real case of hill climbing or high speed riding, the existent speed changing function of an ordinary bicycle is usually in fact spared and unused. In order to make the practical features for the speed changing function of the bicycle more publicized, the present inventor has diligently studied this object, and has finally innovated the present novel speed changing arrangement; that is, the present invention is related to a method of speed changing wherein by means of the arrangement of a gear shifting shaft set in the spacing directly between the speed changing gear set and the output gear set, the gear shifting process can be first manipulated to the neutral gear state and then change to the desired gear, which may improve and replace the conventional methods of speed changing utilizing a chain to skip across gears. It can be found from measurements and evaluations of the real application conditions that the speed changing needed in riding an ordinary bicycle may generally require only four speed stages of speed changing to satisfy the demands of an ordinary rider: the starting stage (hill climbing), the normal low speed stage (against the wind and loaded), the normal high speed stage (along the wind), and the high speed stage. Therefore the present invention employs the four speed stages of speed changing as the design base. After practically realizing a prototype bicycle, and repeatedly testing and improving said bicycle in the fields, it has been proved that the original expected goals of the design have been achieved actually (the design principles of the present invention can be essentially expanded to five or six speed stages according to the need).

SUMMARY OF THE INVENTION

The present invention is related to a speed changing arrangement for the bicycle wherein the so called speed changing arrangement can be mounted on the main body of the triangular frame of the bicycle and positioned between the left and right pedals; the speed changing arrangement generally includes: a speed changing gear set, an output gear set, a gear shifting shaft set, a hand lever set which can manipulate the operation of the gear shifting shaft set, and several gears communicating therebetween; wherein the hand lever set can be utilized to manipulate a neutral gear cable and a gear shifting cable, so that the gear shifting shaft set can be confined within the spacing between the speed changing gear set of the desired gear stage and the output gear set; thus as the pedal gear is pedaled to rotate, the torque force can be transmitted to the speed changing gear set within the speed changing arrangement, and the power will then be transmitted to the chain sprocket via the output gear set, and eventually the power will be transmitted to the rear chain sprocket via the chain, so that the function of driving the wheel forward with the speed changing capability can be attained.

DETAILED DESCRIPTION OF THE INVENTION

Figure 1:
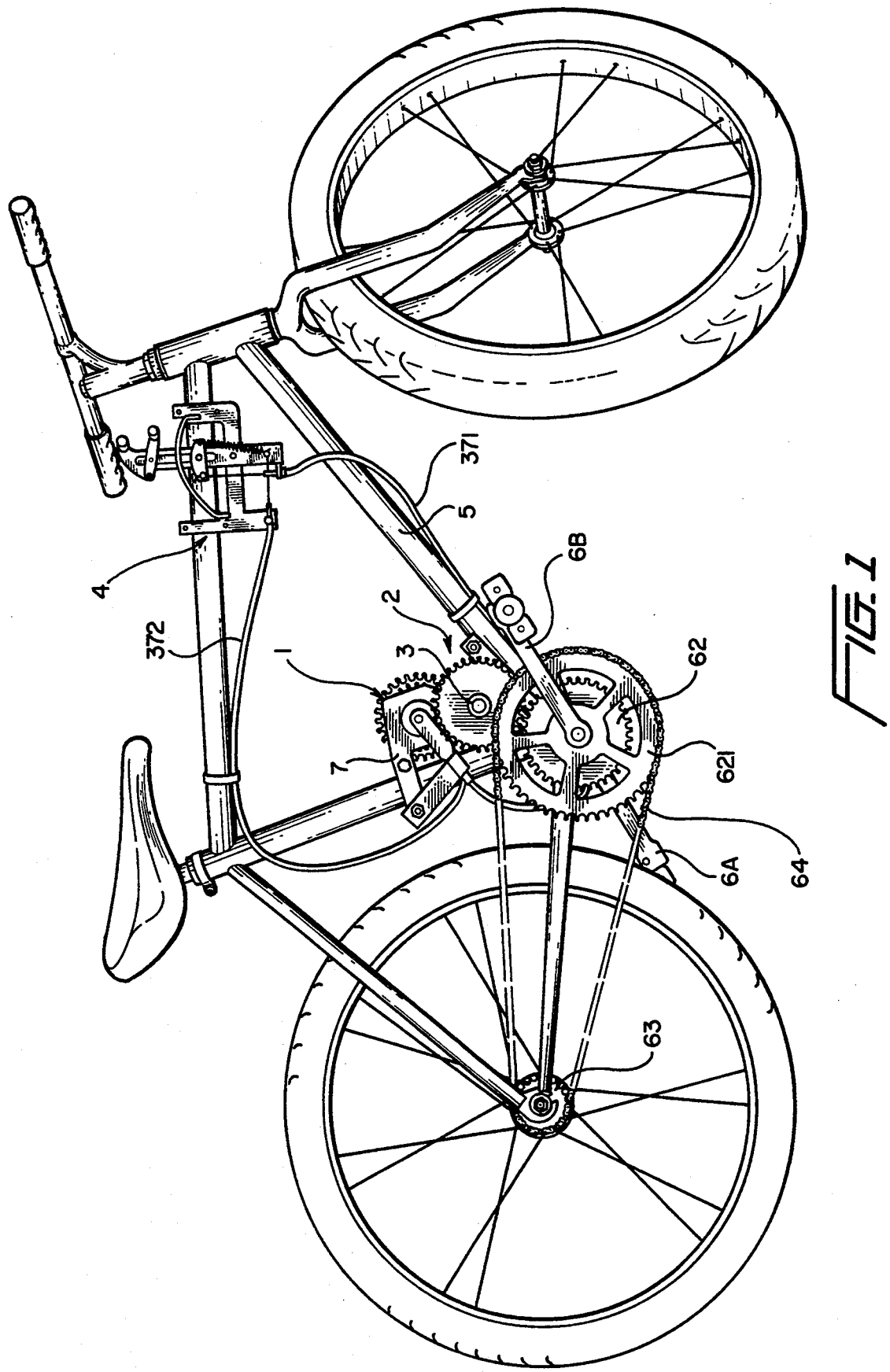
FIG. 1 is a schematic of the arrangement assembled on the bicycle according to the present invention.
Figure 2:
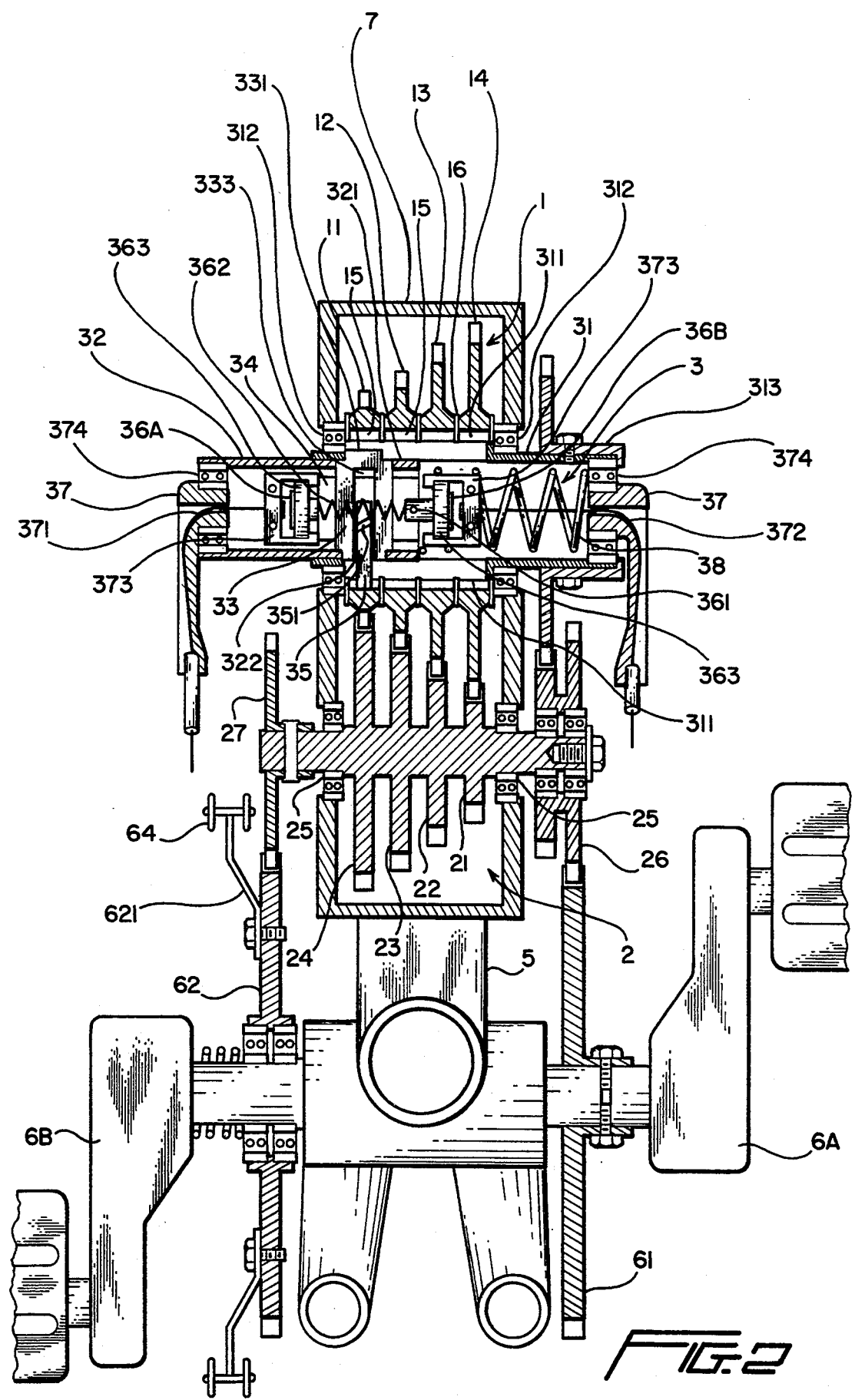
FIG. 2 is an assembled cross-sectional view of the speed changing arrangement according to the present invention.
Figure 3:
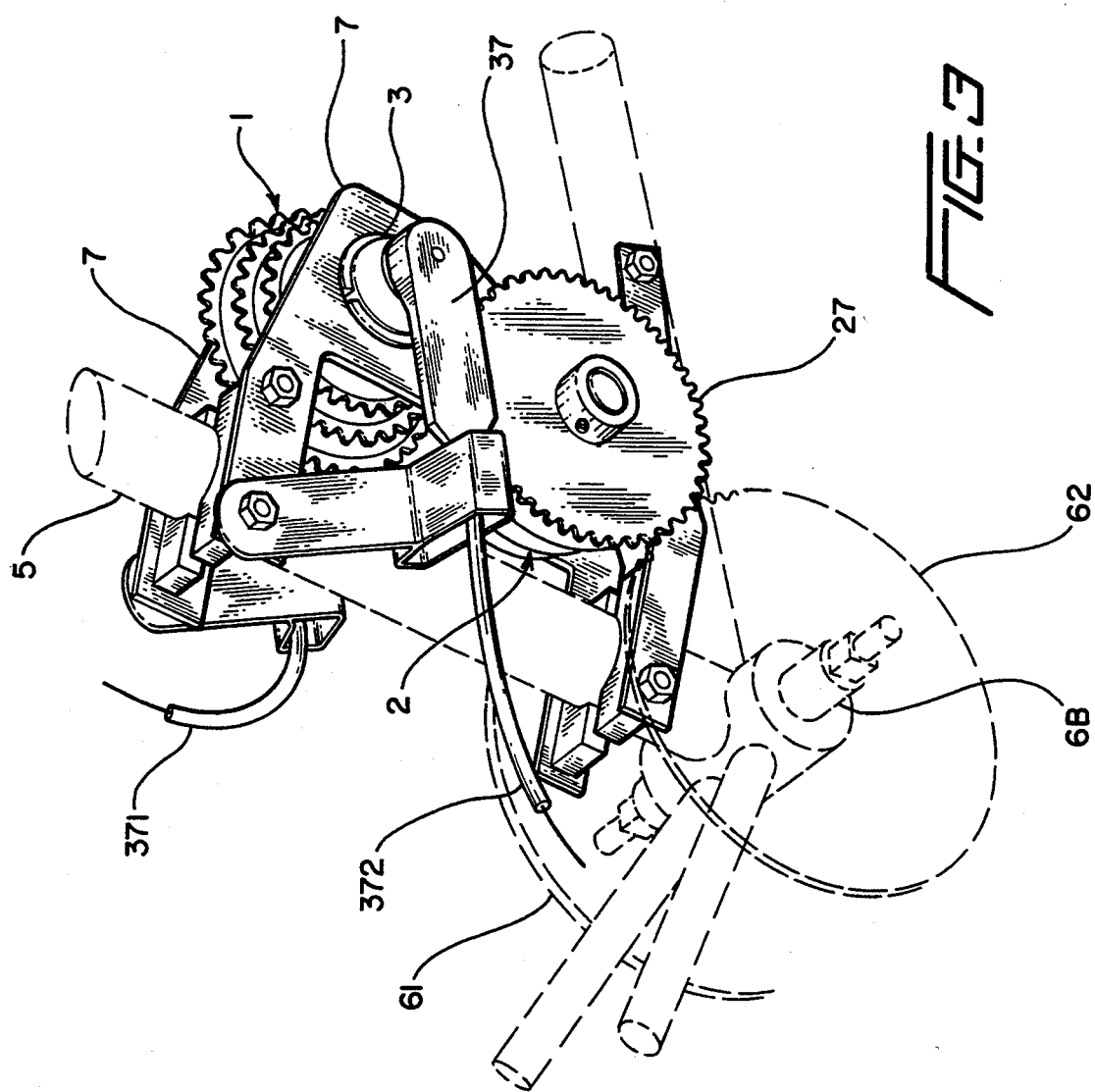
FIG. 3 is an assembled appearance view of the speed changing arrangement according to the present invention.
Figure 4:
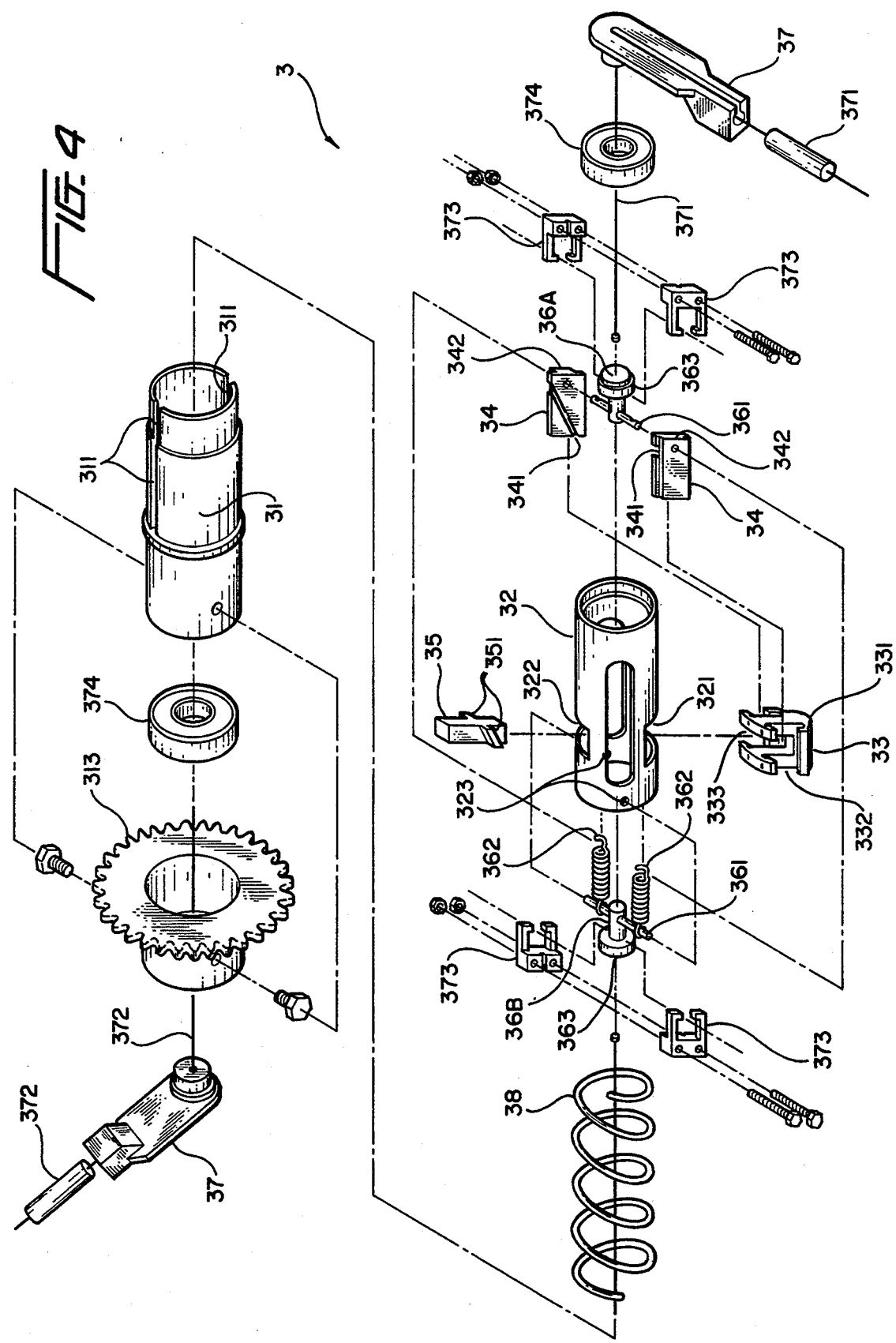
FIG. 4 is an exploded appearance view of the gear shifting shaft set according to the present invention.

Refer now to FIGS. 1, 2, and 3 which are the position schematics of the speed changing arrangement assembled on the bicycle according to the present invention wherein the speed changing arrangement of the present invention can be assembled onto the main body of the triangular frame (5) of the bicycle and positioned between the left and right pedals (6); the speed changing arrangement of the present invention generally includes: a speed changing gear set (1), an output gear set (2), a gear shifting shaft set (3), a hand lever set (4) which can manipulate the operation of the gear shifting shaft set, and several gears communicating therebetween; the structure assembled between respective members is as follows:

Refer now to FIG. 4 and cooperate with FIG. 2. It can be found that the gear shifting shaft set (3) is provided with:

an outer shaft sleeve (31), which is provided with two symmetrical pin grooves (311) at the appropriate locations on the wall thereof, and can be assembled on a structural plate (7) by means of two bearings (312) to present the freely rotatable state wherein one end thereof is securely connected with the left gear cap (313), and the intermediate portion thereof can provide the speed changing gear set (1) to be movably positioned;

an inner shaft sleeve (32), which is provided with a bearer seat groove (321) at an appropriate position on the wall, and the wall symmetrical to the bearer seat groove (321) is provided with a pin groove (322) and two pin column assembling holes (323);

a bearer seat (33), which is provided with an inserted block (331) at the lower edge thereof, and the two sides thereof may respectively form a guide slot (332) which can provide a guide plate (34) to be movably mounted within, in addition, the top of the center thereof is provided with an open-type receiving space (333);

two guide plates (34), which can be inserted into the guide slots (332) of the bearer seat (33) so as to be constrained from escaping, however, which can be guided by the guide slot (332) to slide forward and backward, in addition, the inner wall of the respective guide plate (34) is provided with an inclined slot (341) and a pin column assembling hole (342);

a gear pin (35), which is respectively provided with an inclined flange (351) symmetrically on the two side walls thereof, and after the gear pin (35) has been laid into the open-type receiving space at the top of the center of the bearer seat (33), it is possible to attain positioning by utilizing said inclined flanges (351) to insert into the respective inclined slot (341) of the two guide plates (34);

two rotors (36), which are protrusively provided with two symmetrical pin columns (361) at the respective front ends thereof wherein the pin columns (361) of one of the rotors (36A) can be assembled into the pin column assembling holes (342) of the two guide plates (34), and the pin columns (361) of the other rotor (36B) can be assembled into the pin column assembling holes (323) of the inner shaft sleeve (32); when the two rotors (36) are inserted from both ends of the inner shaft sleeve (32), two pullback springs (362) can be mounted laterally between two pin columns (361), in addition, said two rotors (36) are respectively provided with a bearing (363);

two cable shroud fixing seats (37), which may respectively encase around the ends of the inner shaft sleeve (32) and the outer shaft sleeve (31) by means of two bearing (374) wherein the interiors thereof are respectively provided with a neutral gear cable (371) and a gear shifting cable (372) passing through, and the ends of the neutral gear cable (371) and the gear shifting cable (372) are respectively provided with a two-piece type cable clip (373) wherein the cable clips (373) can be respectively clamped securely at the bearings (363) of the rotors (36);

a compressing spring (38), which has already been laid into the inner shaft sleeve (32) before the inner shaft sleeve (32) is laid into the outer shaft sleeve (31) to perform assembling wherein the compressing spring can provide the reverse movement function for the inner shaft sleeve (32) as said inner shaft sleeve (32) is pulled and held to shift the gear.

Figure 5:
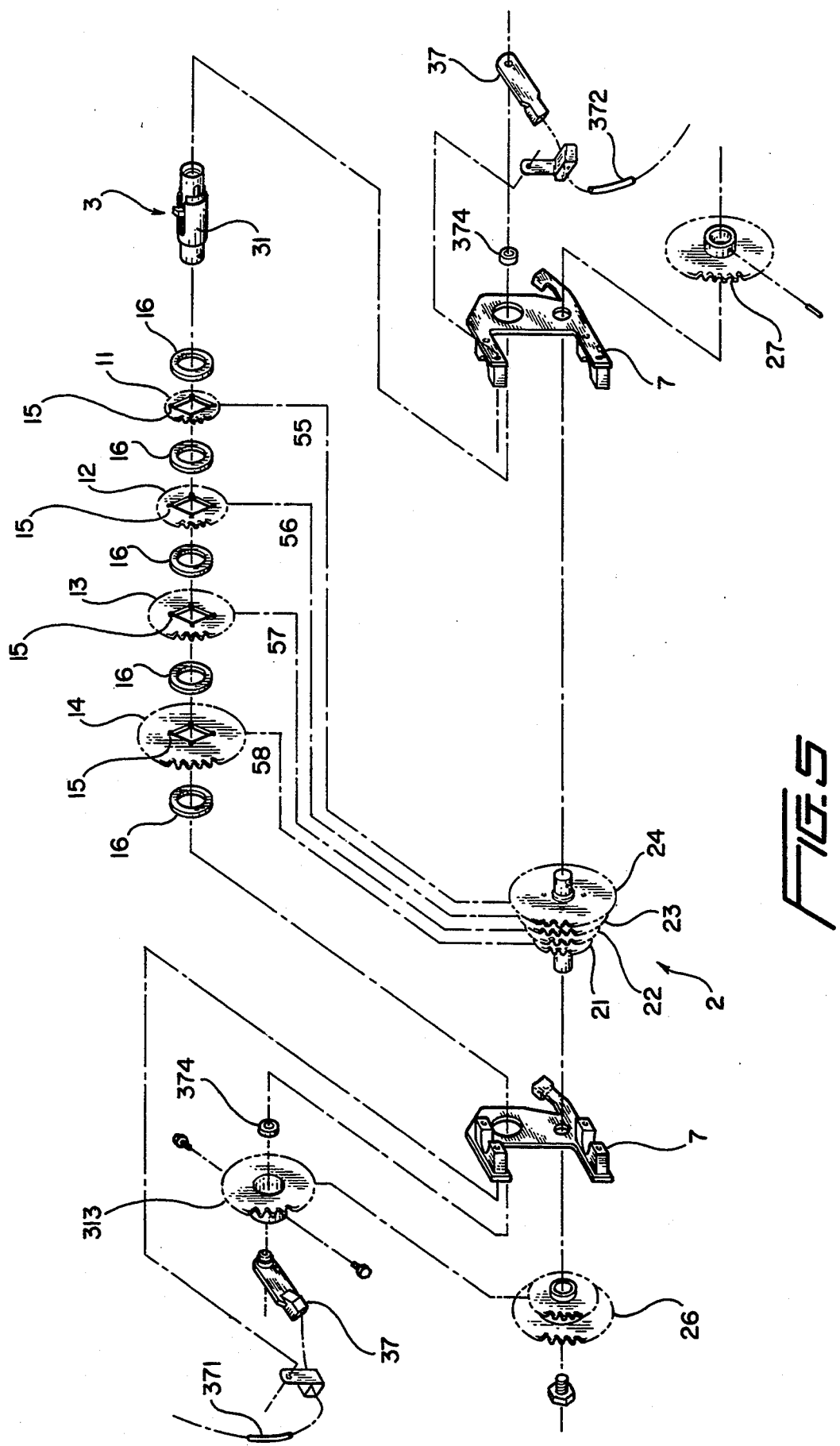
FIG. 5 is an exploded view of the speed changing gear set, the output gear set, and the gear shifting shaft set according to the present invention.

Refer now to FIG. 5 and cooperate with FIG. 2. It can be found that the central holes of the gear shafts of the four speed changing gears (11), (12), (13), and (14) are respectively four gear pin grooves (15) with the equal square size; when it is desired to movably mount the four speed changing gears (11), (12), (13), and (14) onto a specific position at the intermediate portion of the outer shaft sleeve (31) of the gear shifting shaft set (3), there will be respectively an isolating ring (16) sandwiched between any two adjacent speed changing gears; four output gears (21), (22), (23), and (24) are in the coaxially integral configuration, which can be movably mounted on the structural plate (7) by means of bearings (25).

Refer now to FIG. 2 again. It can be found that the gear shifting shaft set (3) is movably mounted on the structural plate (7) by means of the bearings (312); the output gear set (2) is movably mounted on the structural plate (7) by means of the bearings (25); the speed changing gear set (1) is movably mounted at the intermediate position on the outer shaft sleeve (31) of the gear shifting shaft set (3); thus the speed changing gear set (1) may mutually engage with the output gear set (2); the structural plate (7) is secured with sufficient strength on the main body of the triangular frame (5) of the bicycle and positioned between two pedals (6); when the left pedal (6A) is securely mounted with a pedal gear (61), and said pedal gear (61) is engaged with a passive gear (26) which is movably mounted on the axle center of the output gear set (1) by means of bearings, and said passive gear (26) is then engaged with the left gear cap (313) which is securely mounted on the gear shifting shaft set (3); in addition, the other end of said axle center of the output gear set (1) is securely mounted with a longitudinally moving gear (27), said longitudinally moving gear (27) is then engaged with the chain sprocket (62) which is movably mounted on the right pedal (6B), and said chain sprocket (62) is then securely mounted with a gear disk (621), and a chain (64) may wrap around between the gear disk (621) and the rear chain sprocket (63) to constitute the speed changing arrangement of the present invention.

Figure 6:
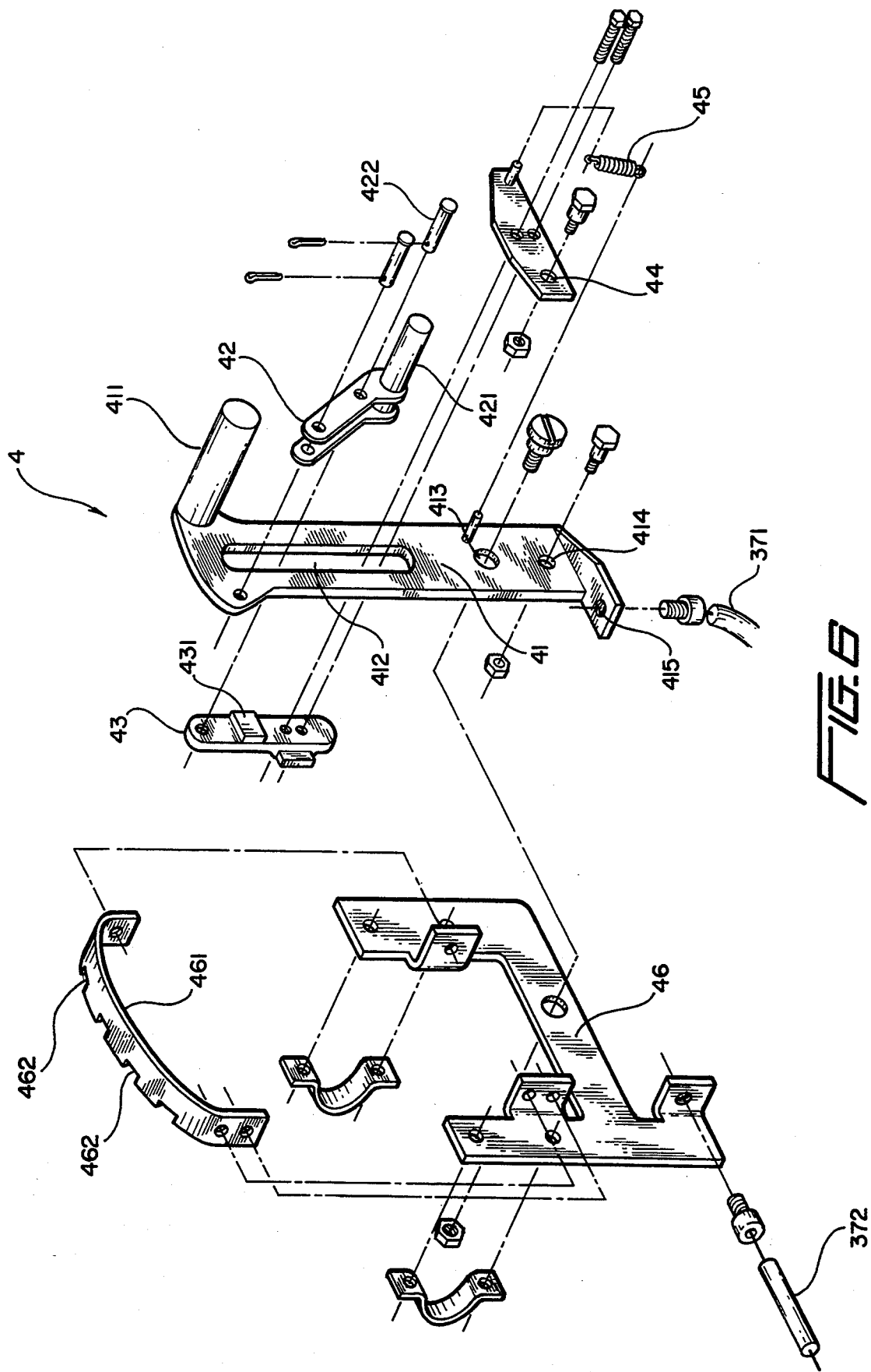
FIG. 6 is an exploded appearance view of the hand lever set according to the present invention.
Figure 7:
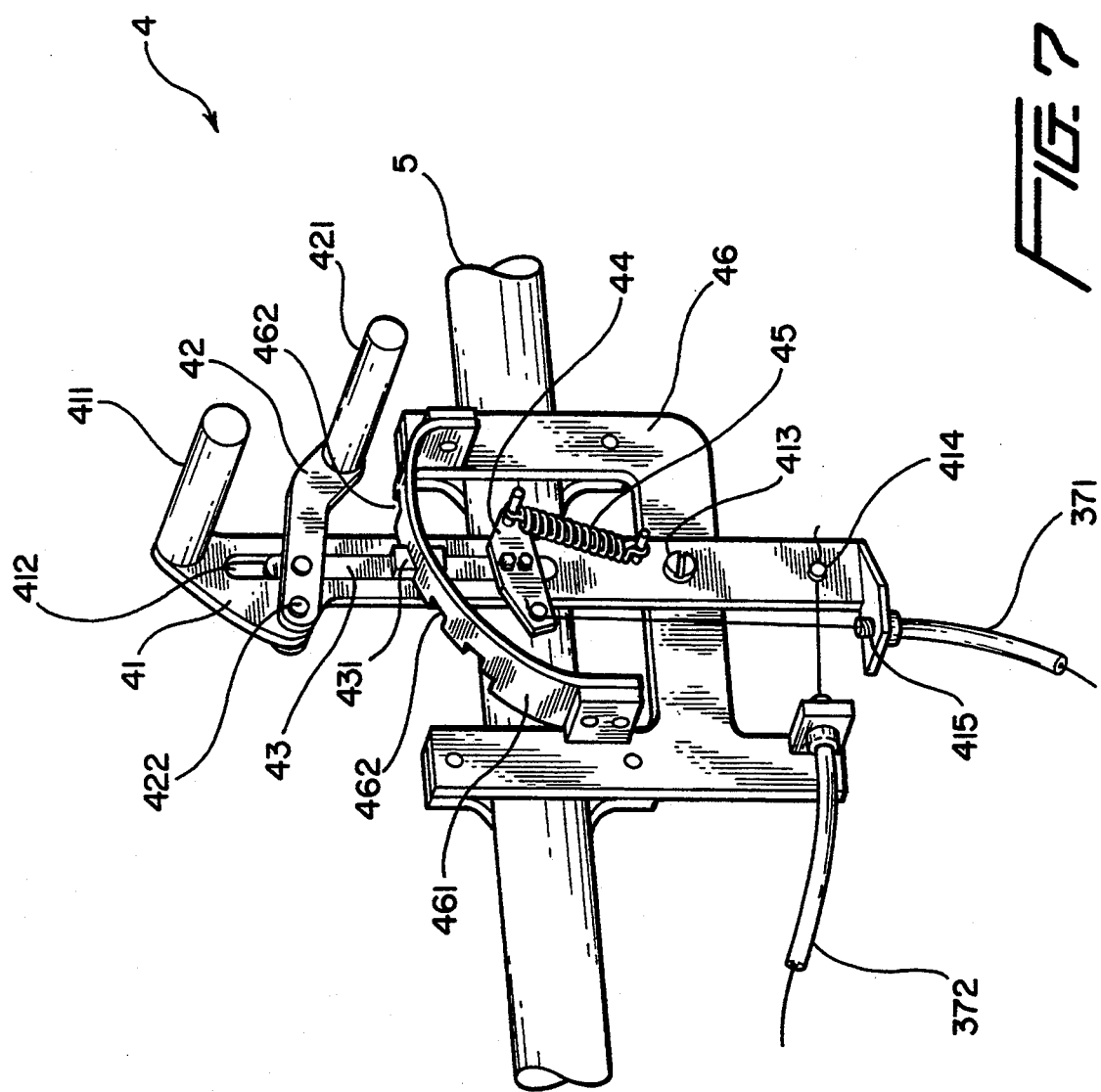
FIG. 7 is an assembled appearance view of the hand lever set according to the present invention.

Refer now to FIGS. 6, 7 and cooperate with FIG. 1. It can be found that the structure of the hand lever set (4) is as follows:

a gear shifting hand lever (41), which is provided laterally with a handle (411) on the top thereof, and an elongated sliding slot (412) is provided at an appropriate position in the vicinity of the top thereof, in addition, an assembling hole (413), a secured connecting hole (414) for the gear shifting cable, and a mounting hole (415) for the neutral gear cable are provided in the vicinity of the bottom;

a neutral gear hand lever (42), which is provided laterally with a handle (421) on the top thereof, and can be movably mounted by means of an inserted pin (422) at an appropriate position in the vicinity of the top of the gear shifting hand lever (41);

a neutral gear sliding block (43), which can be inserted into the elongated sliding slot (412) of the gear shifting hand lever (41), and may utilize the top end thereof to movably connect with the neutral gear hand lever (42) so as to form an integral body wherein one side face thereof is provided protrusively with an inserted block (431);

a connecting plate (44), which is securely mounted on one side of the neutral gear sliding block (43) wherein the purpose of this arrangement is to confine the neutral gear sliding block (43) so as to be constantly positioned within the elongated sliding slot (412) of the gear shifting hand lever (41), so that the neutral gear sliding block (43) can freely slide upward and downward;

a pullback spring (45), which is mounted across between the connecting plate (44) and the gear shifting hand lever (41) so as to provide the pullback force for the neutral gear sliding block (43);

a frame body (46), which can be provided for an arced gear stage identifying seat (461) to assemble and position wherein said gear stage identifying seat (461) is provided with four gear stage confining recesses (462); in addition, the gear shifting hand lever (41) may be assembled on the frame body (46) as shown in FIG. 7 by way of movably mounting, and eventually the frame body (46) can be mounted on the main body of the triangular frame (5) of the bicycle as shown in FIG. 1.

MODE OF OPERATION

Figure 8:
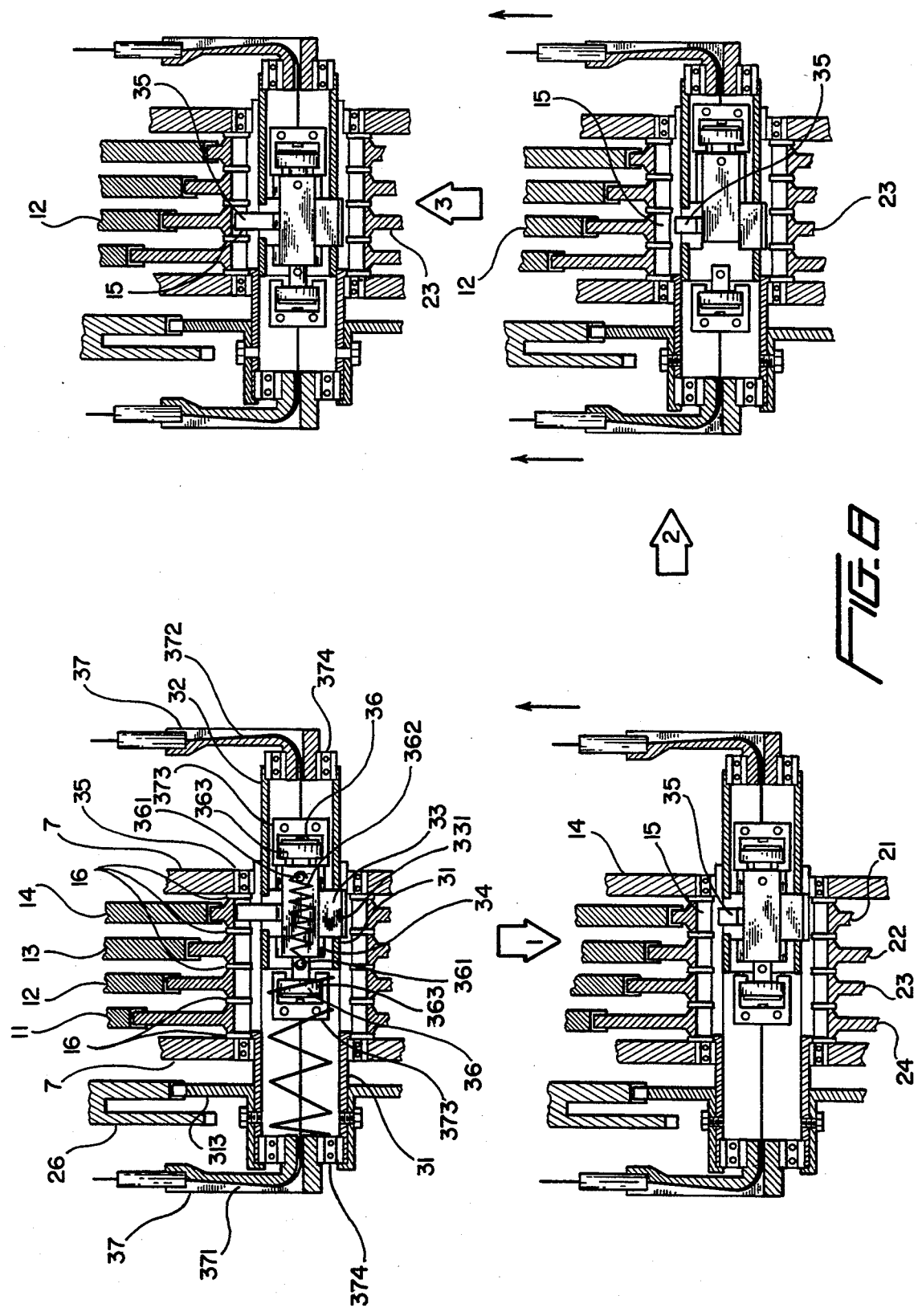
FIG. 8 is a simplified schematic for manipulating gear shifting according to the present invention.

Refer now to FIG. 7 and FIG. 2. It can be found that in the normal condition the gear pin (35) of the gear shifting shaft set (3) may protrusively extend into the pin grooves (322) and (311) of the inner shaft sleeve (32) and outer shaft sleeve (31), and may insert into the gear pin grooves (15) of any speed changing gear; when it is desired to shift the gear (change the speed), it is only needed to simultaneously grasp the handles (411) and (421) of the neutral gear hand lever (42) and gear shifting hand lever (41) by fingers, and forcefully pull up the neutral gear hand lever (42) to bring the neutral gear sliding block (43) to shift upwardly; the upward displacement of the neutral gear sliding block (43) can connectively bring the connecting plate (44) secured with the neutral gear sliding block (43) to move upward concurrently, and may thus pull the neutral gear cable (371) (at the moment, the pullback spring (45) mounted across between the connecting plate (44) and the gear shifting hand lever (41) can be pulled to extend, and may provide the pullback force for the connecting plate (44) to return); as the neutral gear cable (371) is pulled to move, the rotor (36A) within the gear shifting shaft set (3) can be pulled to move backwardly by means of the cable clip (373) at the end of the neutral gear cable (371); and as the rotor (36A) is pulled to move backwardly, the guide plates (34) secured with the rotor (36A) may be simultaneously pulled to move linearly within the guide slots (332) of the bearer seat (33) under the confinement thereof; and as the guide plates (34) move, the inclined slots (341) can be used to couple with the confining relationship for the inclined flanges (351) of the gear pin (35) so that the gear pin (35) can slide into the receiving space (333) of the bearer seat (33) (that is, the gear pin (35) is withdrawn into the inner shaft sleeve (31) and the outer shaft sleeve (32), and the gear pin grooves (15) of the speed changing gear set (1) are no more confining); at the moment, the gear shifting shaft set (3) will be in the neutral gear state, that is, the gear shifting shaft set (3) can freely slide to select the desired gear. At this moment, if the gear shifting hand lever (41) is pushed to move, the gear shifting cable (372) will be pulled; and the pulling of the gear shifting cable (372) can simultaneously pull the rotor (36B) to displace via the cable clips (373) mounted at the end of the gear shifting cable (373) and further by way of the relationship in which the cable clips (373) may clamp securely on the bearing (363) of the rotor (36B); the displacement of the rotor (36B) can pull the inner shaft sleeve (32) to displace to the speed changing gear position of the desired gear stage via the relationship in which the pin columns (36) thereof are inserted into the pin column assembling holes (323) of the inner shaft sleeve (32); the compressing spring (38) mounted between the inner shaft sleeve (32) and the outer shaft sleeve (31) is then in the compressed condition, and can provide the reverse movement function for the inner shaft sleeve (32); simultaneously remove all fingers from the handles (411) and (421); the pullback force of the pullback spring (45) may then pull back the neutral gear sliding block (43); as the neutral gear sliding block (43) is pulled back, the inserted block (431) thereof may be inserted into the gear stage confining recess (462) of the gear stage identifying seat (461), and will be kept in said gear stage constantly; at the moment of said action, the neutral gear cable (371) can be pulled back to make the rotor (36A) return back to its original condition; the returned original condition of the rotor (36A) can manipulate the gear pin (35) to return to the condition of protruding into the inner shaft sleeve (31) and the outer shaft sleeve (32) so that the gear pin (35) can be confined within the gear pin groove (15) of the speed changing gear set (1); that is, in general, the pulling of the neutral gear hand lever (42) can manipulate the gear pin (35) to withdraw into the interior of the gear shifting shaft set (3) so that the gear pin (35) can no longer be confined within the gear pin groove (15) of the speed changing gear set (1), and will thus present the neutral gear condition which enables the gear shifting shaft set (3) to manipulate the gear stage; in reverse, the gear pin (35) can be constantly confined within the gear pin groove (15) of the speed changing gear set (1) so as to achieve the positioning of the gear shifting, as shown in the simplified operating schematic of FIG. 8.

The power transmission mode of the present invention is as follows:

When the rider drives the pedals (6) to rotate, the torque force thereof can be transmitted to the pedal gear (61), and may then synchronously rotate the passive gear (26) engaged with the pedal gear (61); in addition, since the passive gear (26) is movably mounted at the axle center of the output gear set (2) by means of bearings, the passive gear (26) will not connectively drive the output gear set (2); however, the passive gear (26) can freely rotate so that it can transmit the rotating force thereof via the left gear cap (313) engaged with it to drive the gear shifting shaft set (3) to rotate synchronously; and the rotation of the gear shifting shaft set (3) can drive the speed changing gear to rotate synchronously by way of utilizing the gear pin (35) to confine the speed changing gear; said rotating speed changing gear can couple and revolve the output gear engaged with it; and the power may then be transmitted from the longitudinally moving gear (27) secured at the common axle thereof to the chain sprocket (62); and then the speed-changed power will be transmitted to the chain sprocket (63) of the rear wheel through the gear disk (621) and the chain (64) so as to attain the function of driving the wheels forward with the speed changing capability.

We claim:

1. A speed changing arrangement for a bicycle, wherein said arrangement comprises a speed changing gear set having a plurality of gears, an output gear set having a plurality of gears engaged with the speed changing gear set, a gear shifting shaft, a hand lever to manipulate the operation of said gear shifting shaft wherein said speed changing gear set, said output gear set, and said gear shifting shaft are assembled onto a structural plate, and said structural plate is assembled on the frame of said bicycle and positioned between the left and right pedals, wherein:

a) said gear shifting shaft comprises:

an outer shaft sleeve, defining two symmetrical first pin grooves on a wall thereof and rotatably attached to said structural plate by means of bearings;

an inner shaft sleeve, slidably located within the outer shaft sleeve so as to move axially with respect to the outer shaft sleeve and defining a bearer seat groove and a second pin groove on a wall thereof;

a bearer seat, located in the bearer seat groove and having an inserted block on a lower edge thereof, and defining a guide slot on two side walls thereof, and a central top portion thereof defining an open receiving space;

two guide plates, each slidably located in a guide slot, each defining an inclined slot and a pin column assembling hole on an inner wall surface thereof;

a gear pin, having inclined flanges symmetrically extending from two side walls thereof, such that the flanges slidably engage the inclined slots of the guide plates, the gear pin movable between an extended position wherein it extends through said pin groove in the inner and outer shaft sleeve so as to drivingly engage a gear of said gear changing gear set, and a retracted position wherein said gear pin is disengaged from all gears of the gear changing gear set;

two rotors, each having a pin column extending therefrom and are respectively provided with a bearing;

a compression spring, operatively connected between said inner shaft sleeve and said outer shaft sleeve;

two cable shroud fixing seats, connected to opposite ends of said inner shaft sleeve and said outer shaft sleeve by means of bearings, one cable shroud fixing seat connected to a neutral gear cable and the other cable shroud fixing seat connected to a gear shifting cable;

b) the hand lever comprises:

a gear shifting hand lever, defining an elongated sliding slot at a top thereof, an assembling hole, a secured connecting hole for a gear shifting cable, and a mounting hole for a neutral gear cable adjacent to a bottom thereof;

a neutral gear hand lever, pivotally mounted on gear shifting hand lever adjacent to the top thereof;

a neutral gear sliding block, slidably located in the elongated sliding slot and attached to the neutral gear hand lever, the sliding block provided with an inserted block extending from a side wall thereof;

a connecting plate, secured on said neutral gear sliding block;

a pullback spring, attached to said connecting plate and said gear shifting hand lever;

a frame body, having an arced gear stage identifying seat attached to the bicycle frame and to the gear shifting hand lever wherein said gear stage identifying seat defines a plurality of gear stage confining recesses;

c) a neutral gear cable extending between said connecting plate and one of said two rotors:

d) a gear shifting cable extending between said gear shifting hand lever and the other of said two rotors;

e) drive means drivingly connecting the speed changing gear set and a pedal assembly located on the bicycle such that rotation of the pedal assembly causes rotation of the speed changing gear set;

whereby movement of the neutral gear hand lever moves the gear pin between its extended and retracted positions and movement of the gear shifting hand lever causes axial movement of the inner shaft sleeve so as to position the gear pin in alignment with one of the plurality of gears of the speed changing gear set.

* * * * *